United States Patent [19]
Gregory et al.

[11] Patent Number: 5,412,299
[45] Date of Patent: May 2, 1995

[54] VARIABLE SERVO LOOP COMPENSATION IN AN ACTIVE HAND CONTROLLER

[75] Inventors: William W. Gregory, St. Petersburg; Wayne E. Lance, Largo; Jeffrey W. Hegg, North Redington Beach, all of Fla.

[73] Assignee: Honeywell, Inc., Minneapolis, Minn.

[21] Appl. No.: 171,549

[22] Filed: Dec. 21, 1993

[51] Int. Cl.$^6$ ............................................. B64C 13/16
[52] U.S. Cl. ................................. 318/628; 318/648; 318/568.17; 74/471 XY
[58] Field of Search ............... 318/560–648, 318/649; 74/471 XY, 89, 22; 338/128, 98; 244/234, 85, 236, 182, 237, 180, 194, 179; 901/9, 15, 8; 200/6 A; 364/167.01, 190

[56] References Cited

U.S. PATENT DOCUMENTS

| | | | |
|---|---|---|---|
| 4,095,763 | 6/1978 | Builta | 318/565 |
| 4,150,803 | 4/1979 | Fernandez | 74/471 XY |
| 4,420,808 | 12/1983 | Diamond et al. | 364/434 |
| 4,476,954 | 10/1984 | Johnson et al. | 74/471 XY |
| 4,477,043 | 10/1984 | Repperger | 24 X/223 |
| 4,531,080 | 7/1985 | Wordstrom et al. | 318/628 |
| 4,603,388 | 7/1986 | Griffith et al. | 364/433 |
| 4,661,032 | 4/1987 | Arai | 318/568 |
| 4,688,443 | 8/1987 | Fabre et al. | 74/471 XY |
| 4,956,780 | 9/1990 | Sankrithi et al. | 364/428 |
| 5,056,038 | 10/1991 | Kuno et al. | 364/513 |
| 5,072,361 | 12/1991 | Davis et al. | 318/568.17 |
| 5,076,517 | 12/1991 | Ferranti et al. | 74/471 XY |
| 5,107,080 | 4/1992 | Rosen | 200/6 A |
| 5,116,180 | 5/1992 | Fung et al. | 74/471 X |
| 5,142,931 | 9/1992 | Menakhem | 74/471 XY |

*Primary Examiner*—Paul Ip
*Attorney, Agent, or Firm*—Gregory A. Bruns

[57] ABSTRACT

A state detector and loop compensation parameter controller for use with an active hand controller system having a single hand controller or having first and second hand controllers, processing and control means for the hand controllers and a flight control computer. The state detector and loop compensation parameter controller accepts a plurality of inputs and provides a plurality of adjustment signals to the processing and control means to improve the performance of the active hand controller system.

25 Claims, 9 Drawing Sheets

VARIABLE SERVO LOOP COMPENSATION IN AN ACTIVE HAND CONTROLLER

CROSS-REFERENCE TO RELATED APPLICATIONS

This invention is related to copending application Ser. No. 07/957,278 and Ser. No. 07/957,427 having the same assignee as the present application.

BACKGROUND OF THE INVENTION

This invention relates generally to a control system of the type wherein manual control devices such as a control stick are provided which have an electro simulated variable rate feel. Hand controller systems having this electro simulated variable rate feel are commonly referred to as active hand controllers. The related inventions referenced hereinbefore utilize electric motors to produce desired hand controller force and position response. These systems require sensors which can provide accurate and stable information about the position of the hand grip and the force or torque exerted upon the hand grip by the operator. The present invention relates specifically to servo motor response in an active hand controller. In the past, servo motor response in an active hand controller has been adversely affected by requirements for large peak motor forces and stable operation with a large null detent, i.e., a large nonlinearity in the force vs. displacement characteristic of the control stick. Control system designers must select several control loop parameters such as integrator time constant, loop gain, proportional gain, damping and motor controller force gain when designing a system. The selection of control loop parameters is made more difficult because the parameters interact and affect one another. In addition, the loop parameters must provide satisfactory operation over a wide range of operating environments. In the past, the parameter selection process typically proceeds by selecting a motor controller force gain to meet the system peak force requirement when the integrator output is near its maximum output. Then by using simulation techniques, analysis, and lab tests the remaining control loop parameters are iteratively selected to achieve the best system response and stability. Once the control designer is satisfied with a particular set of parameters, they are fixed in the design.

Aircraft control systems operate over a wide range of conditions and system performance could be enhanced by modifying the control loop parameters for different conditions. For example when only small system force is required a small motor controller gain could be used and the remaining parameters could be adjusted for fast response. Conversely when peak motor force is required the motor controller gain could be increased and the remaining parameters could be adjusted for stability. Thus a need exists for a servo control system for an aircraft control stick that provides for adjusting the control loop parameters according to operating conditions.

SUMMARY OF THE INVENTION

The present invention solves these and other needs by providing a state detector and loop compensation parameter controller for use with a first hand controller connected to a first actuator and a second hand controller connected to a second actuator, processing and control means and a flight control computer. The processing and control means has a plurality of input signals and a plurality of adjustable control parameters which determine the relationship of the input signals to the processing and control drive signal to the first actuator. The state detector and loop compensation detector accepts a force scaling command from the flight control computer, torque signals from a first and second hand controller, and position signals from a first and second hand controller. The state detector and loop compensation controller is suitably programmed according to a predetermined sequence to process the force scaling command, the torque signals and the position signals and provide adjustment signals for the plurality of adjustable control parameters. The present invention may also be used in an active hand controller system which has only a single hand controller.

DETAILED DESCRIPTION

Figure 1:
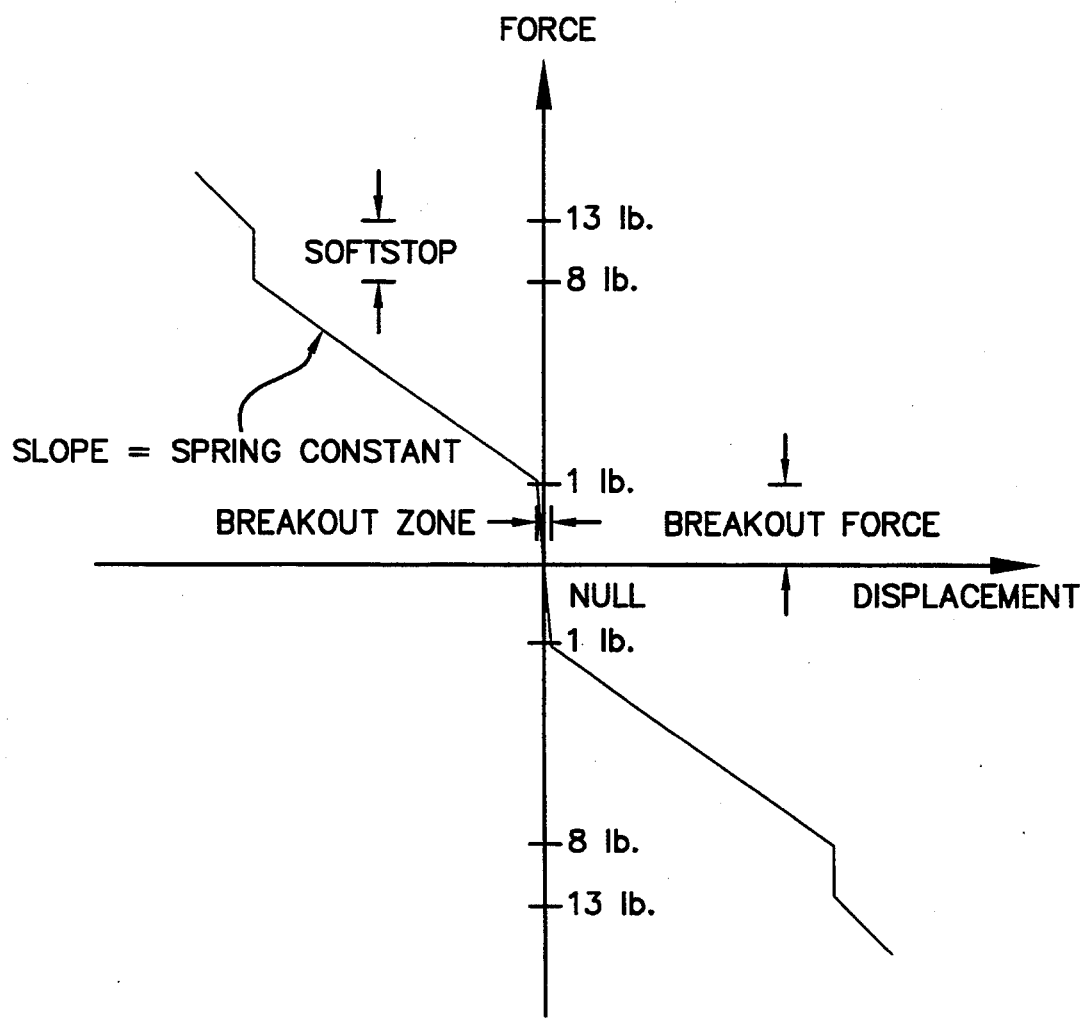
FIG. 1 is a graph showing the relationship of the force applied to a hand grip of an active hand controller versus hand controller movement or displacement.

FIG. 1 illustrates an example of a force versus displacement curve for an active hand controller. The curve of FIG. 1 illustrates the requirement for a large null detent, i.e., a large nonlinearity in the force vs. displacement curve in the breakout force region, and the normal operating range limited by a softstop. When the stick has been moved to the softstop, an additional amount of force e.g. 5 lbs. is needed to move the stick beyond softstop.

Figure 2A:
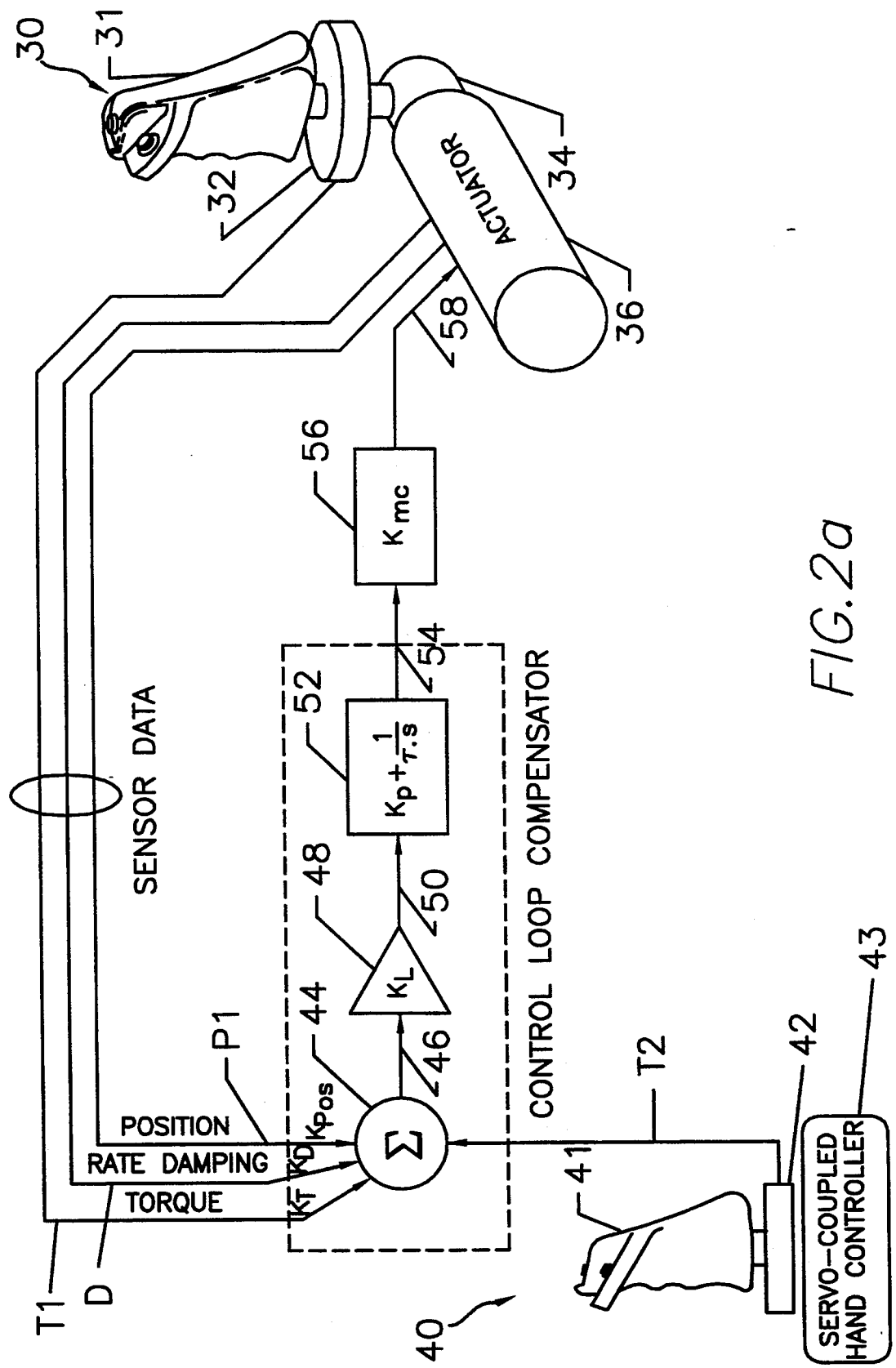
FIG. 2a is a diagram of a servo control loop for coupled active hand controllers.

FIG. 2a illustrates a servo loop for a servo-coupled hand control system which includes a first manual control device and a second manual control device. First manual control device or stick 30 has a hand grip 31 and is connected to a force-moment cell 32 which is connected through a gimbal 34 and through a gear head (not shown) to an actuator 36 which provides a resisting force on the stick. The servo loop of FIG. 2a also includes a second manual control device or stick 40 having hand grip 41 and force-moment cell 42 connected in a manner similar to control device 30. Force-moment cells 32 and 42 may be devices of the type described in patent application Ser. No. 07/957,278 or may be other types. For example a moment cell of the type located in line with the actuator may be used. Moment cell 32 provides torque signal T1 and moment cell 42 provides torque signal T2. A position detecting transducer generates position signal P1. Rate damping signal D is a velocity signal representing the rate at which actuator 36 is turning. Rate damping signal D could be provided by a tachometer, but is preferably provided by using a resolver to sense position and a resolver to digital converter chip that has a rate output which is rate damping signal D.

The servo coupled hand controller block designated 43 includes the same type elements that are shown in FIG. 2a for manual control device 30.

Summing device 44 has the following inputs: a position signal, P1, which represents the position of actuator 36 and changes linearly with actuator rotational position; a torque signal T1 representing the torque at control stick 30 and changes linearly with the force sensed at control stick 30; a coupling torque signal T2 representing the coupling torque and changing linearly with the force sensed at control stick 40; a rate damping signal D which changes linearly with actuator rotational velocity. P1, T1, T2, and D are all signals that have magnitude and polarity and may be represented by, for example, voltages between −10V DC and +10 volts DC. Within summing device 44, T1 and T2 are summed and a scaling factor KT is applied to the result; a scaling factor KPOS is applied to P1; and a rate damping scaling factor KD is applied to rate damping signal D. The application of the scaling factors provides resultant values for torque, position and rate damping which are then summed to provide an output 46. Summing device 44 can be implemented using an operational amplifier having four summing inputs.

Loop gain amplifier 48 has a gain KL and output 46 of summing device 44 is operated on by loop gain KL to provide output 50. Proportional Gain/Integrator 52 includes a proportional gain KP and an integration time constant, $\tau$. Proportional Gain/Integrator 52 has signal 50 as an input and output 54. Motor Controller amplifier 56 has a gain Kmc and has output 54 of Proportional Gain/Integrator 52 as its input and converts input 54 to a motor winding torque command 58 which is applied to actuator 36. It is understood that a value or setting must be determined for the loop compensation parameters of KL, Kp, $\tau$ and Kmc shown in FIG. 2a which will provide satisfactory operation e.g., sufficient peak force, stability and response. In the past a value was selected for Kmc that would meet the maximum force requirement when proportional gain/integrator 52 was near saturation and other parameters were then selected.

Figure 3A:
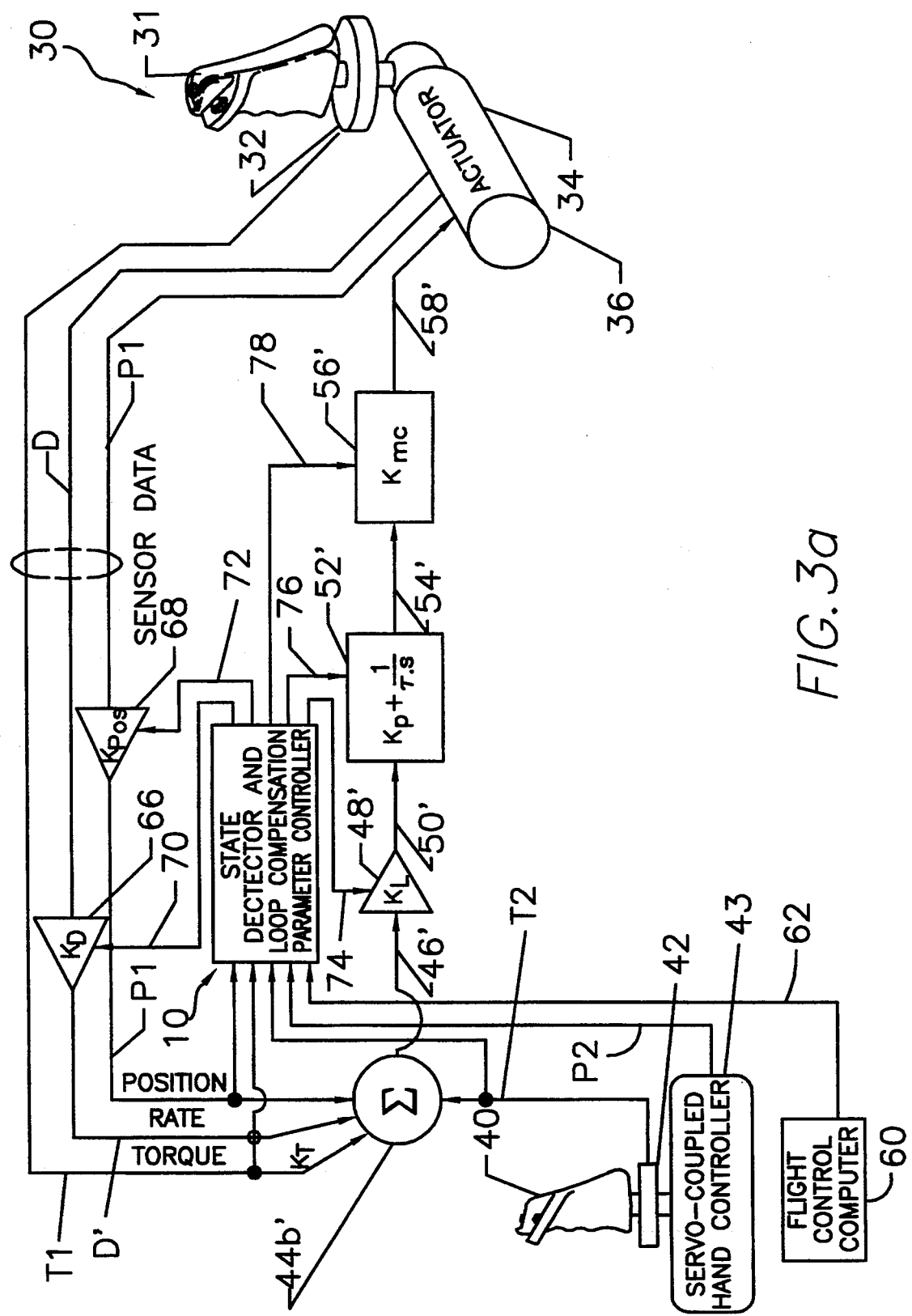
FIG. 3a is a diagram of a servo control loop for coupled active hand controllers in accordance with the teachings of the present invention.

FIG. 3a illustrates an improved servo loop diagram. A flight control computer 60 provides a force scaling command signal 62 which controls certain characteristics of the force versus displacement curve shown in FIG. 1. For example during low speed flight, such as take-off and landing it is desirable to have movement of the hand controller be soft and easy, but during high speed flight conditions it is desirable to have movement of the hand controller be stiff and hard. Flight control computer 60 is capable of controlling the shape of the curve of FIG. 1.

Hand controller 40 has a servo coupled loop 43 similar to the servo loop shown in FIG. 3a for hand controller 30. For simplicity, servo coupled loop controller 43 is not shown in its entirety.

FIG. 3a illustrates the addition of a State Detector and Loop Compensation Parameter Controller 10 in accordance with the teachings of the present invention. State Detector and Loop Compensation Parameter Controller 10 will be referred to herein as SD & LCPC 10. In addition, rate gain amplifier 66, and position gain amplifier 68 have been added to the servo loop diagram of FIG. 3a. As shown in FIG. 3a SD & LCPC 10 accepts position signal P1' and torque signal T1 from hand controller 30 as inputs as well as coupling torque T2, and coupling position P2, from hand controller 40. In addition, flight control computer 60 provides force scaling command 62 to SD & LCPC 10.

Rate gain amplifier 66 has rate damping signal D as an input, D' as an output, and a gain, $K_D$, adjustable by signal 70 from SD & LCPC 10. Position gain amplifier has position signal $P_1$ as an input, $P_1'$ as an output, and a gain, $K_{POS}$, adjustable by signal 72 from SD & LCPC 10. Summing device 44' has the following inputs: a position signal $P_1'$, a torque signal $T_1$, a coupling torque signal $T_2$, and a rate damping signal D'. Summing device 44' operation is generally similar to that of previously described summing device 44.

Loop gain amplifier 48' has signal 46' as an input, and a gain, $K_L$, adjustable by signal 74 and an output signal 50'. Proportional gain and integrator 52' has signal 50' as an input and signal 54' as an output. Proportional gain $K_P$ and integration time constant $\tau$ are adjustable by signal 76. Motor controller gain amplifier 56' has signal 54' as an input, signal 58' as an output and gain, $K_{mc}$, adjustable by output signal 78 from SD & LCPC 10.

SD & LCPC 10 may be implemented using analog electrical hardware or it may be implemented by using digital electronics and a software controlled processor. In an analog implementation SD & LCPC 10 would accept analog signals for torque $T_1$, torque $T_2$, position $P_1$ and position $P_2$. SD & LCPC 10 would provide analog control signals for signals 70, 72, 74, 76 and 78.

Figure 4:
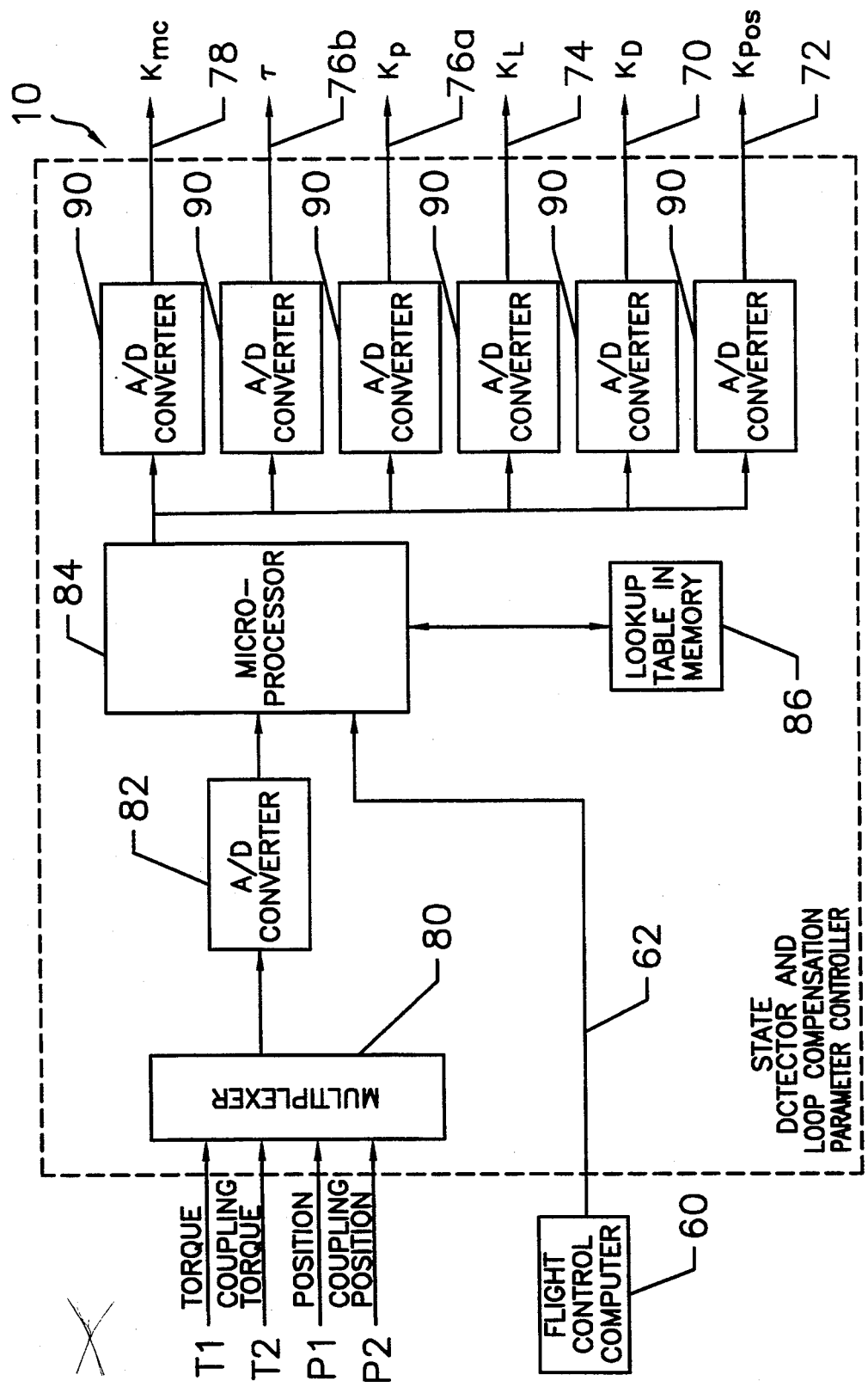
FIG. 4 is a functional block diagram of the state detector and loop compensation parameter controller of the present invention.

One digital embodiment of SD & LCPC 10 is shown in functional block form in FIG. 4. Multiplexer 80 accepts inputs of torque $T_1$, coupling torque $T_2$, position $P_1'$, and coupling position $P_2$. These inputs are multiplexed into analog to digital converter 82 and then into microprocessor 84. Force scaling command 62 is also an input to microprocessor 84. Microprocessor 84 is coupled to a lookup table 86 in memory. Microprocessor 84 provides outputs to Digital to analog converters 90. D/A converters 90 then provide the adjustment signals as follows. Signal 70 to adjust rate gain $K_D$, signal 72 to adjust position gain $K_{POS}$, signal 74 to adjust loop gain $K_L$, signal 76a to adjust proportional gain, signal 76b to adjust the time constant $\tau$ of proportional gain and integrator 52' and signal 78 to adjust motor controller gain $K_{mc}$.

Figure 2B:
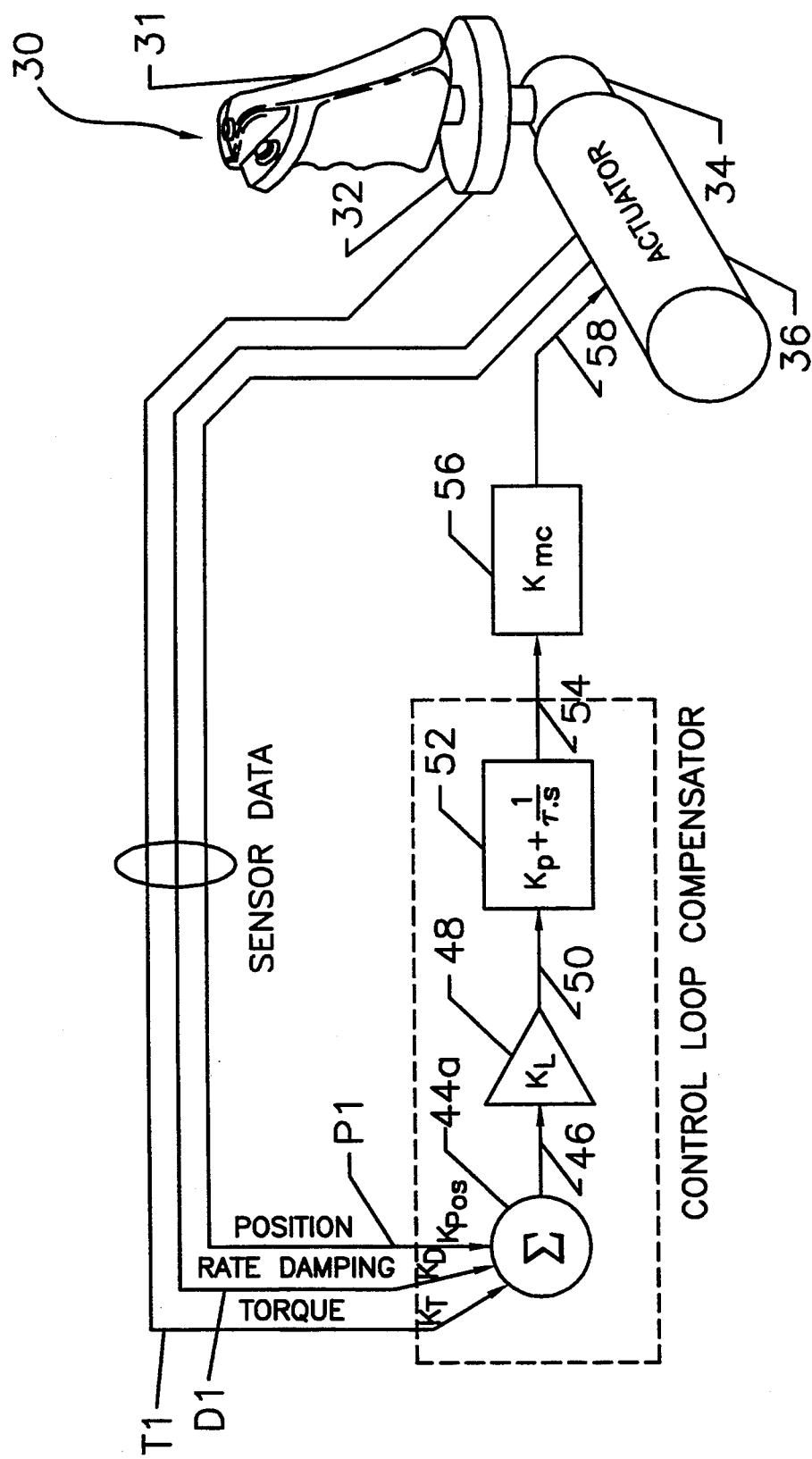
FIG. 2b is a diagram of a servo control loop for a single active hand controller.

While the present invention has been described by reference to a system of coupled active hand controllers, it is to be understood that the principles of the invention are easily applied to a single active hand controller system. FIG. 2b illustrates a single stick system. It is noted that second manual control device 40, hand grip 41, force-moment cell 42, servo-coupled hand controller 43 and coupling torque T2, which were shown in FIG. 2a have been omitted in the illustration of FIG. 2b. Also, summing device 44b of FIG. 2b will only require torque $T_1$, rate damping D and position $P_1$ as inputs.

Figure 3B:
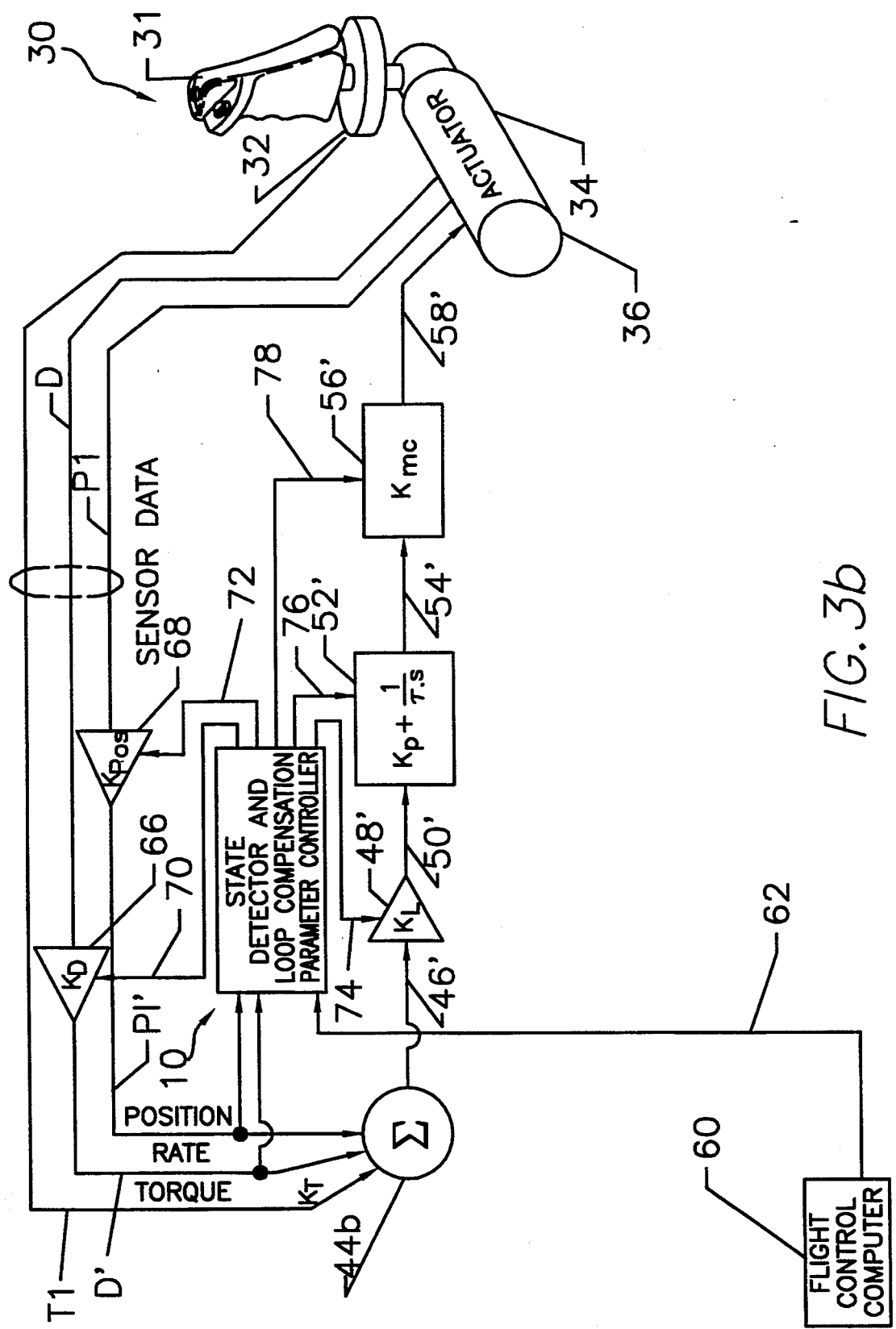
FIG. 3b is a diagram of a servo control loop for a single active hand controller in accordance with the present invention.

FIG. 3b illustrates the application of the present invention to a single active hand controller system. Again, the devices associated with a second hand controller are omitted as in FIG. 2b and summing device 44b will only require torque $T_1$, rate damping D and position $P_1$ as inputs. In addition, SD & LCPC does not receive a coupling torque signal $T_2$ on coupling position signal $P_2$.

Figure 5:
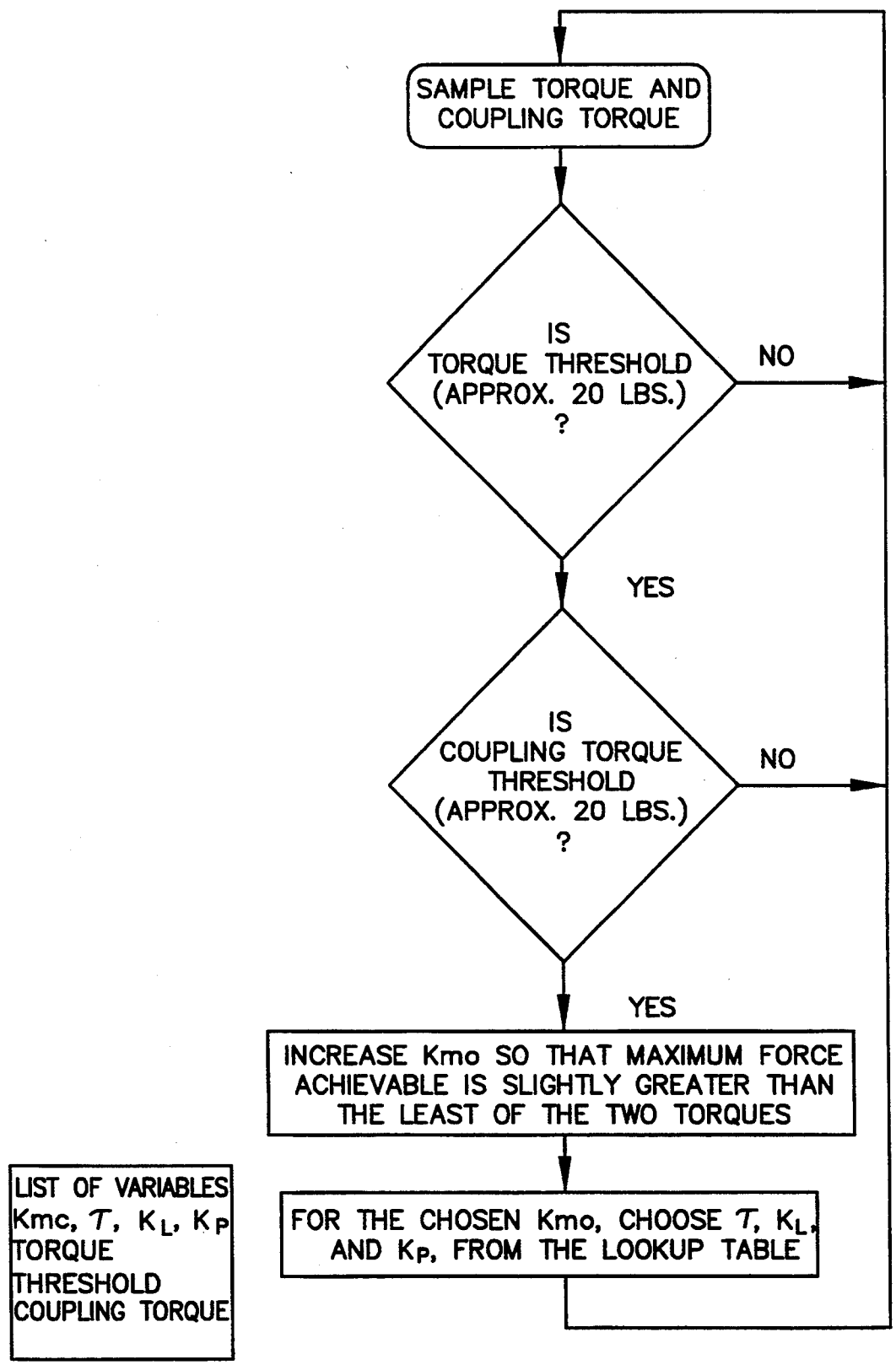
FIGS. 5–7 are signal flow diagrams in accordance with the invention of FIG. 4.

Examples of the operation of LCPC 10 are given in the flow charts shown in FIGS. 5–7 which will be explained. FIG. 5 illustrates a flow diagram for the process of choosing motor controller gain based on measurements of torque $T_1$ and coupling torque $T_2$ and is not applicable to the single controller of FIG. 3b. In active hand controller systems under some conditions a pilot and a co-pilot may each be attempting to move their respective control stick in opposite directions. This is referred to a force fight and stable control system operation should continue when this condition occurs. SD & LCPC 10 as illustrated in FIG. 5 samples torque $T_1$ and coupling Torque $T_2$ and when both $T_1$ and $T_2$ are above a threshold value, for example, 20 lbs., then KMC is increased so that the maximum force is slightly greater than the lesser of $T_1$ and $T_2$. Values for integration time constant $\tau$, loop gain $K_L$ and proportional gain are then chosen from look up table 86.

U.S. patent application Ser. No. 07/957,427 (attorney docket number A34-14311) explained that the amount of rate damping required to stabilize an active hand controller about the null position exceeds that needed at other positions versus position curve of a motor to which such a control stick is connected to achieve breakout forces. Application Ser. No. 07/957,427 disclosed an analog implementation of an improvement which provides position dependent rate damping in an active hand controller. U.S. patent application Ser. No. 07/957,427 is hereby incorporated by reference.

Figure 6:
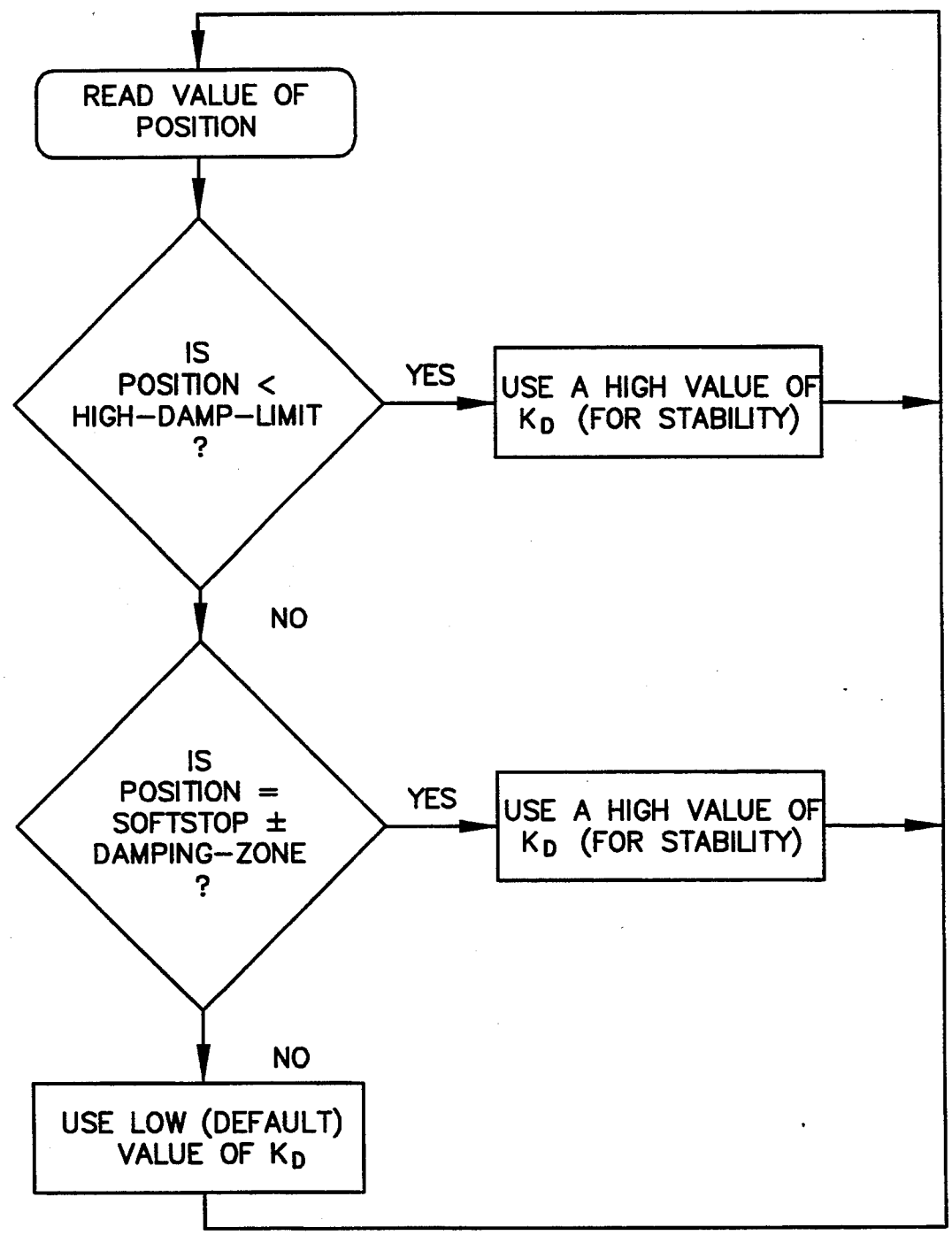

The digital means for implementing position dependent rate damping according to the present invention is shown in FIG. 6 which is a flow diagram for the process of selecting a value for rate gain, $K_D$, based on the position of the hand controller. When the position is less than the high damping limit a high value of $K_D$ is used. For other positions a low default value is used for $K_D$.

Figure 7:
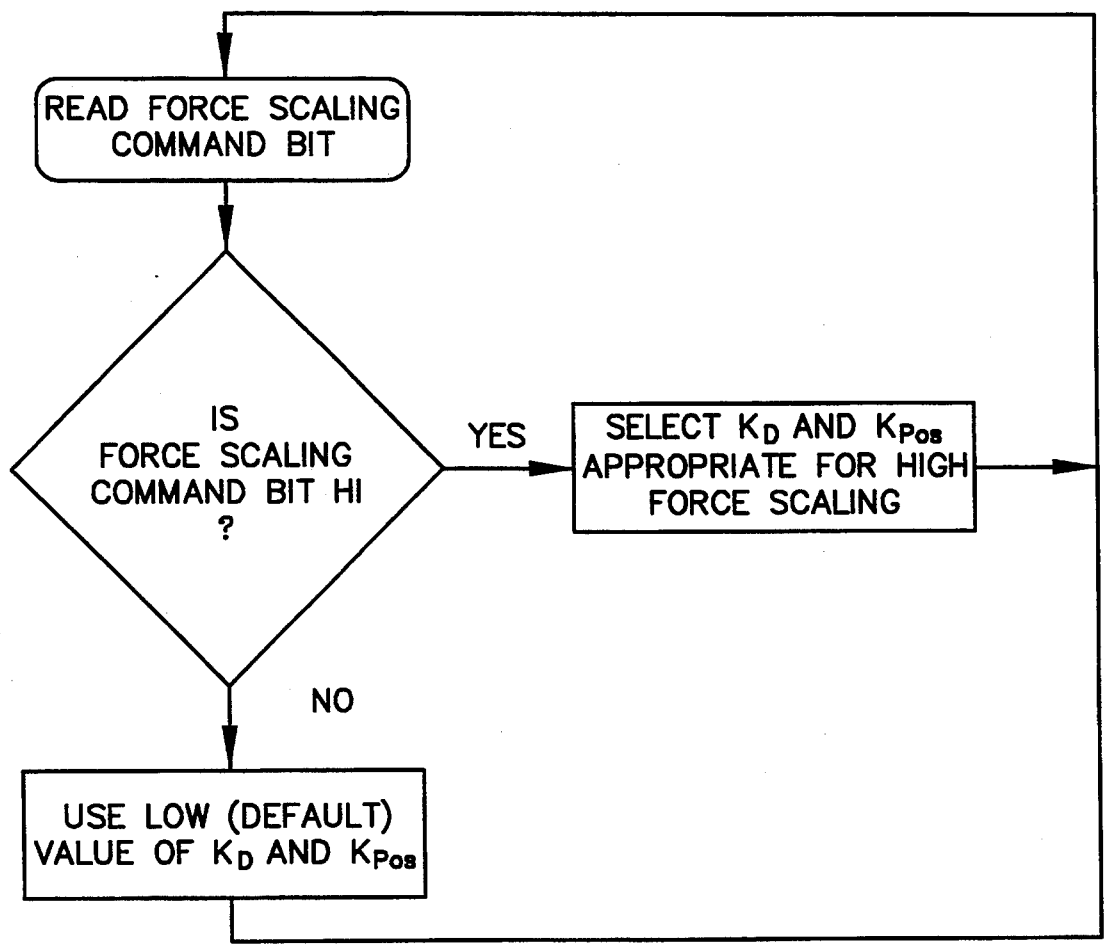

FIG. 7 is a flow diagram of the process for selecting values for position gain, $K_{POS}$, and damping gain, $K_D$ as a function of the force scaling command 62. When the force scaling command is large, high force scaling is selected and when force scaling command is small, low or default values are used for $K_{POS}$ and $K_D$.

Microprocessor 84 is suitably programmed to execute the processes shown in the flow diagrams of FIGS. 5, 6 and 7.

Now that the basic operation of SD & LCPC 10 have been described, certain advantages can be set forth and appreciated. SD & LCPC 10 provides a method of setting $K_{mc}$ and $K_D$ relatively low, $\tau$ relatively fast, and $K_L$ and $K_p$ relatively high under some operating conditions, thus allowing for enhanced performance. Then, under other conditions, these parameters would be adjusted to generate the peak motor torque and maintain stability while operating under the other conditions. Examples of different operating conditions that would be sensed could include: a force fight between two operators where a very large motor force is required; the breakout region shown in FIG. 1 where stability is typically a problem; the force gradient region shown in FIG. 1 where smoothness is crucial and stability is not generally a problem; the softstop region shown in FIG. 1 where stability problems are also encountered. It may also be desirable to change $K_{mc}$, $\tau$, $K_L$, $K_p$, $K_D$, and $K_{POS}$ through software as the characteristics of FIG. 1 change for different system modes, for example, high speed flight, low speed flight, zero g operation, hover mode, force reflection, and others. The present invention allows the designer to meet a wide range of operating requirements while at the same time enhance performance characteristics under each mode of operation. This technique is especially applicable to active hand controllers for several reasons. For example, the servo loop for an active hand controller must have stable performance characteristics when producing up to 50–100 pounds of force yet maintain a smooth 'feel' down to fractions of an ounce. Also, the servo loop must remain stable when programmed with a large null detent breakout force—typically up to 3 or 4 lbs, with approximately zero motion. Therefore, performance enhancements by using the described technique are significant, if not required, to meet the wide range of operating requirements for hand controllers.

Referring to FIG. 3, SD & LCPC 10 would use a set of numbers for $K_{mc}$, $\tau$, $K_L$, $K_p$, and $K_D$ based on certain conditions, then when those conditions change, a new set of numbers is plugged in for $K_{mc}$, $\tau$, $K_L$, $K_p$, $K_D$, and $K_{POS}$. Or as an operational enhancement, the system could be designed to make linear, rather than discrete, changes in the parameters. For example, at the onset of a force fight, the gain Kmc could be ramped up to meet the increasing force requirement.

It is not intended that coverage be limited by the disclosed embodiments, but only by the terms of the following claims.

We claim:

1. An active hand controller system for use with a flight control computer providing a force scaling command signal, said active hand controller system having a first hand controller means connected to a first actuator means, comprising:

rate detecting means for providing a rate signal from said first actuator means;

torque detecting means for providing a first torque signal from said first hand controller means;

position detecting means for providing a first position signal from said first actuator means; and processing and control means for accepting said rate signal, said first torque signal said first position signal, and said force scaling command signal and providing a drive signal to said first actuator, said processing and control means including a plurality of parameters, each said parameter being adjustable to a value, said plurality of parameter values determining a relationship of said drive signal to said rate signal, said torque signal, said position signal and said force scaling command signal; and state detecting and parameter controlling means for accepting and processing according to a first sequence, said first torque signal, said first position signal, and said force scaling command signal, and providing a plurality of control parameter adjustment signals to adjust said adjustable control parameters to a plurality of values, said plurality of values having a relationship to said torque signal, said position signal and said force scaling command signal.

2. Active hand controller system of claim 1 wherein said plurality of control parameters include rate gain and position gain and said state detecting and parameter controlling means provides a rate gain adjustment signal and a position gain adjustment signal.

3. Active hand controller system of claim 2 wherein said plurality of parameters further includes loop gain and said state detecting and parameter controlling means provides a loop gain adjustment signal.

4. Active hand controller system of claim 3 wherein said plurality of control parameters further comprise proportional gain and integration and said state detecting and parameter controlling means provides a proportional gain and integration adjustment signal.

5. Active hand controller system of claim 4 wherein said plurality of parameters further comprise motor controller gain and said state detecting and parameter controlling means provides a motor controller gain adjustment signal.

6. Active hand controller system of claim 1 further comprising:
   a second hand controller means connected to a second actuator means;
   torque detecting means for providing a second torque signal from said second hand controller means;
   position detecting means for providing a second position signal from said second actuator means; and
   wherein said state detecting and parameter controlling means includes means for accepting and processing according to a second predetermined sequence said first and second torque signals, said first and second position signals, and said force scaling command signal, and providing a second plurality of control parameter adjustment signals to adjust said adjustable control parameters to a second plurality of values, said second plurality of values having a relationship to said first and second torque signals, said first and second position signals and said force scaling command signal.

7. Active hand controller system of claim 1 wherein said state detecting and parameter controlling means accepts analog control signals for said first torque signal and said first position signal, and said state detecting and parameter controlling means provides a plurality of analog control parameter adjustment signals.

8. Active hand controller system of claim 6 wherein said state detecting and controlling means accepts analog control signals for said first torque signal, said second torque signal, said first position signal and said second position signal and said state detecting and parameter controlling means provides a second plurality of analog control parameter adjustment signals.

9. In an active hand controller system of the type for use with a flight control computer providing a force scaling command, said active hand controller system having a first hand controller means connected to a first actuator means, a second hand controller means connected to a second actuator means, first torque detecting means for detecting torque at said first hand controller and providing a first torque signal, second torque detecting means for detecting torque at said second hand controller and providing a second torque signal, first position detecting means for detecting position at said first actuator and providing a first position signal, rate detecting means for detecting rate at said first actuator and providing a rate signal, processing and control means for accepting said first and second torque signals, said first position signal, said rate signal and said flight command signal and providing a drive signal to said first actuator, said processing and control means having a plurality of control parameters, said plurality of control parameters determining a relationship of said drive signal to said torque signals, said position signals, said rate signal and said force scaling command signal, the improvement comprising:
   second position detecting means for detecting position at said second actuator and providing a second position signal,
   said plurality of control parameters being adjustable, and;
   state detecting and parameter controlling means for accepting and processing according to a first sequence, said first and second torque signals, said first and second position signals, and said force scaling command signal, and providing a plurality of control parameter adjustment signals to adjust said adjustable control parameters to a plurality of values, said plurality of values having a relationship to said torque signals, said position signals and said force scaling command signal.

10. Active hand controller system of claim 9 wherein said plurality of control parameters include rate gain and position gain and said state detecting and parameter controlling means provides a rate gain adjustment signal and a position gain adjustment signal.

11. Active hand controller system of claim 10 wherein said plurality of parameters further comprise loop gain and said state detecting and parameter controlling means provides a loop gain adjustment signal.

12. Active hand controller system of claim 11 wherein said plurality of control parameters further comprise proportional gain and integration and said state detecting and parameter controlling means provides a proportional gain and integration adjustment signal.

13. Active hand controller system of claim 12 wherein said plurality of parameters further comprise motor controller gain and said state detecting and parameter controlling means provides a motor controller gain adjustment signal.

14. Active hand controller system of claim 9 wherein said state detecting and controlling means accepts analog control signals for said first torque signal, said second torque signal, said first position signal and said second position signal and said state detecting and parameter controlling means provides a second plurality of analog control parameter adjustment signals.

15. Active hand controller system of claim 13 wherein said state detecting and controlling means accepts analog control signals for said first torque signal, said second torque signal, said first position signal and said second position signal and said state detecting and parameter controlling means provides a second plurality of analog control parameter adjustment signals.

16. Active hand controller system of claim 9 wherein said state detecting and parameter controlling means comprises:
   multiplexing means for receiving said first and second torque signals, said first and second position signals and said force scaling command signal and providing a first output signal;
   first conversion means connected to said multiplexing means for converting said first output signals into a first digital signal;
   processor means including lookup means connected to said first conversion means for receiving said first digital signal and processing said first digital signal according to a predetermined control sequence to arrive at a second output signal;
   second conversion means connected to said processor means for receiving said second output signal and converting said second signal into said plurality of parameter adjustment signals.

17. Active hand controller system of claim 13 wherein said state detecting and parameter controlling means comprises:
   multiplexing means for receiving said first and second torque signals, said first and second position signals and said force scaling command signal and providing a first output signal;

first conversion means connected to said multiplexing means for converting said first output signals into a first digital signal;

processor means including lookup means connected to said first conversion means for receiving said first digital signal and processing said first digital signal according to a predetermined control sequence to arrive at a second output signal;

second conversion means connected to said processor means for receiving said second output signal and converting said second signal into said plurality of parameter adjustment signals.

18. An active hand controller system for use with a flight control computer providing a force scaling command signal, said active hand controller system having a first hand controller means connected to a first actuator means, a second hand controller means connected to a second actuator means, comprising:

rate detecting means for providing a rate signal from said first actuator means;

torque detecting means for providing a first torque signal from said first hand controller means;

torque detecting means for providing a second torque signal from said second hand controller means;

position detecting means for providing a first position signal from said first actuator means;

position detecting means for providing a second position signal from said second actuator means;

processing and control means for accepting said rate signal, said first and second torque signals, said first position signal, and said force scaling command signal and providing a drive signal to said first actuator, said processing and control means including a plurality of parameters, each said parameter being adjustable to a value, said plurality of parameter values determining a relationship of said drive signal to said rate signal, said torque signals said position signal and said force command signal; and state detecting and parameter controlling means for accepting and processing according to a first sequence, said first and second torque signals, said first and second position signals, and said force scaling command signal, and providing a plurality of control parameter adjustment signals to adjust said adjustable control parameters to a plurality of values, said plurality of values having a relationship to said torque signals, said position signals and said force scaling command signal.

19. Active hand controller system of claim 18 wherein said plurality of control parameters include rate gain and position gain and said condition detecting and parameter controlling means provides a rate gain adjustment signal and a position gain adjustment signal.

20. Active hand controller system of claim 19 wherein said plurality of parameters further comprise loop gain and said condition detecting and parameter controlling means provides a loop gain adjustment signal.

21. Active hand controller system of claim 20 wherein said plurality of control parameters further comprise proportional gain and integration and said condition detecting and parameter controlling means provides a proportional gain and integration adjustment signal.

22. Active hand controller system of claim 21 wherein said plurality of parameters further comprise motor controller gain and said condition detecting and parameter controlling means provides a motor controller gain adjustment signal.

23. Active hand controller system of claim 18 wherein said state detecting and controlling means accepts analog control signals for said first torque signal, said second torque signal, said first position signal and said second position signal and said state detecting and parameter controlling means provides a second plurality of analog control parameter adjustment signals.

24. Active hand controller system of claim 22 wherein said state detecting and controlling means accepts analog control signals for said first torque signal, said second torque signal, said first position signal and said second position signal and said state detecting and parameter controlling means provides a second plurality of analog control parameter adjustment signals.

25. Active hand controller system of claim 18 wherein said condition detecting and parameter controlling means comprises:

multiplexing means for receiving said first and second torque signals, said first and second position signals and said force scaling command signal and providing a first output signal;

first conversion means connected to said multiplexing means for converting said first output signals into a first digital signal;

processor means including lookup means connected to said first conversion means for receiving said first digital signal and processing said first digital signal according to a predetermined control sequence to arrive at a second output signal;

second conversion means connected to said processor means for receiving said second output signal and converting said second signal into said plurality of parameter adjustment signals.

* * * * *